UNITED STATES PATENT OFFICE.

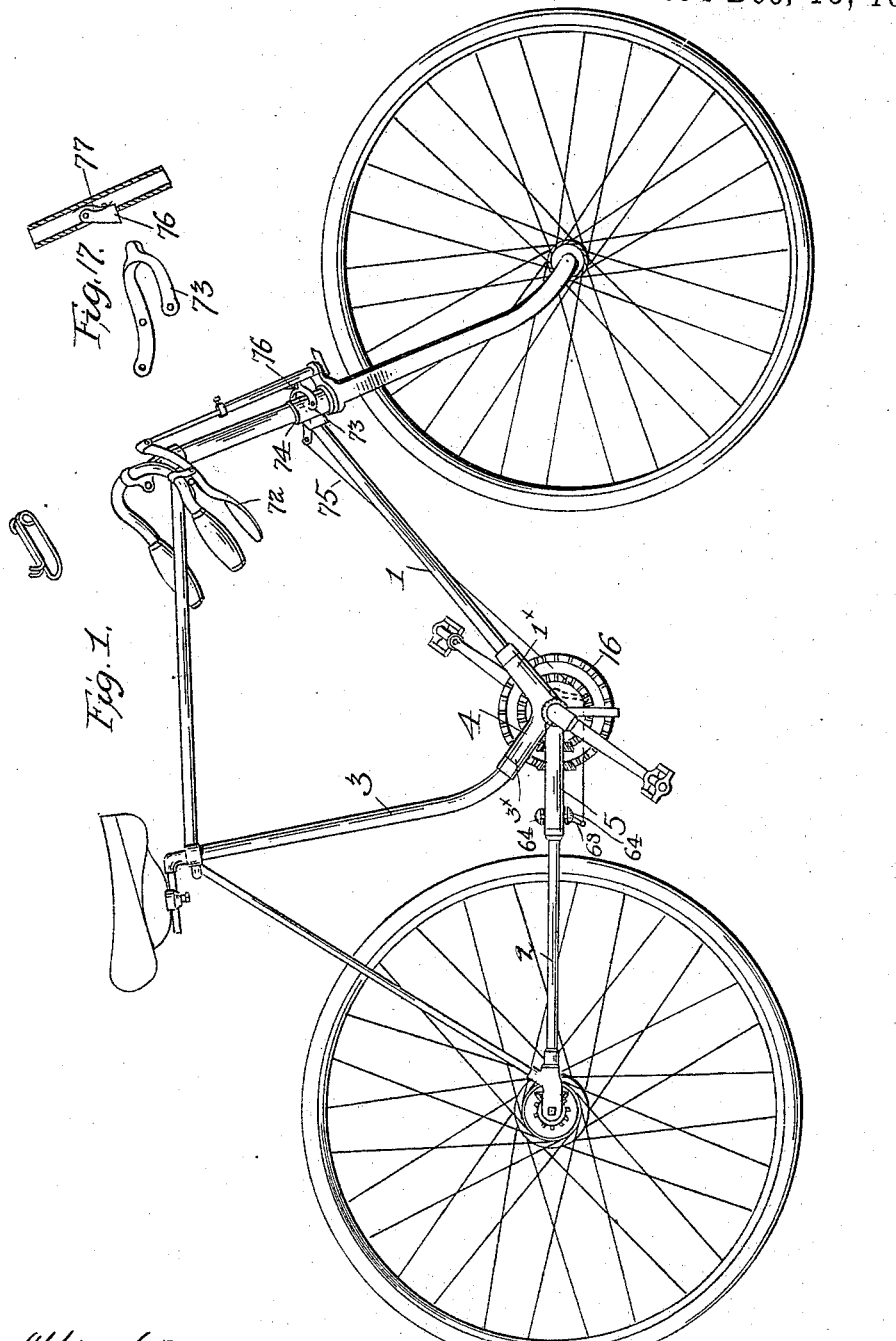

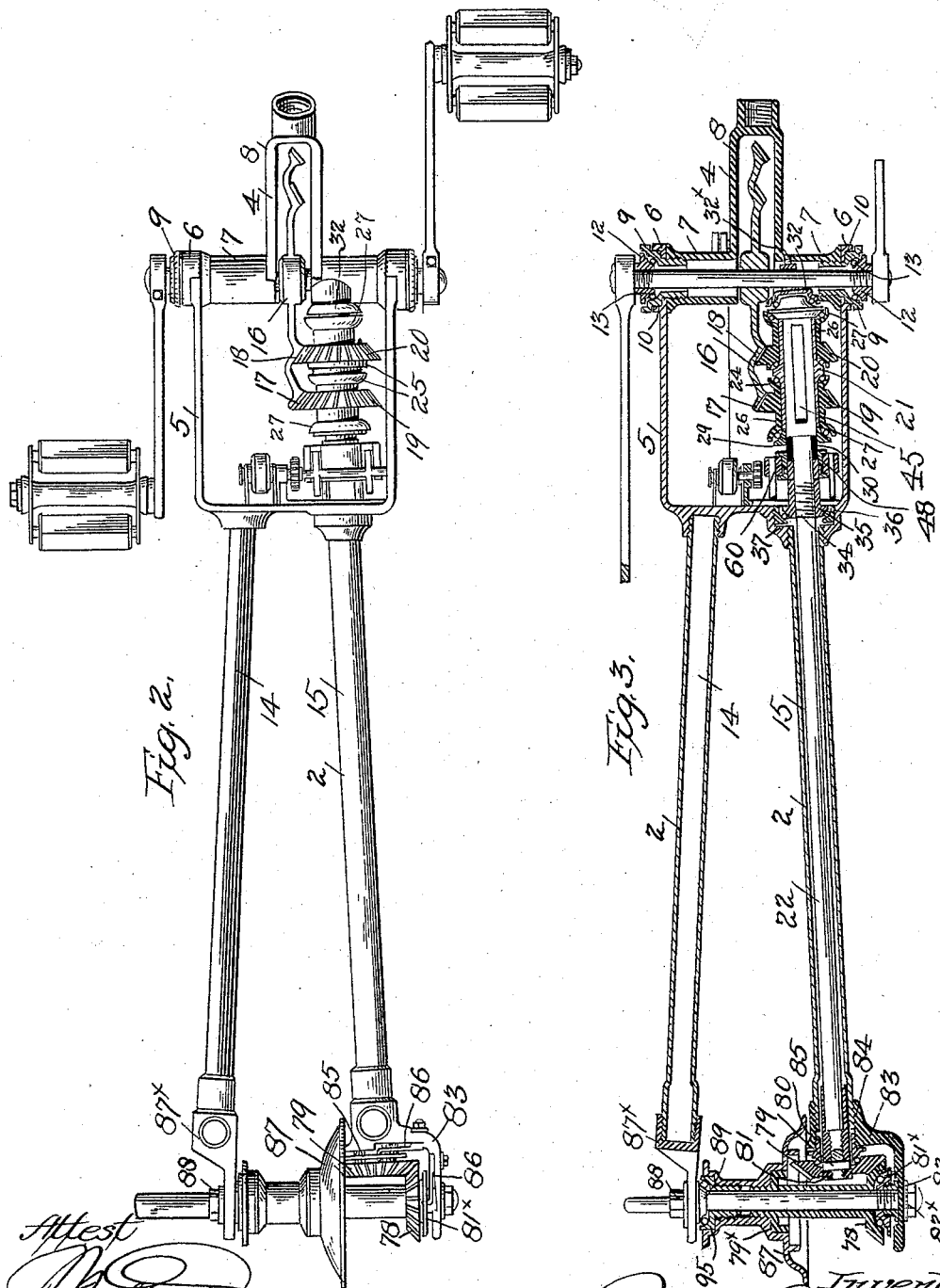

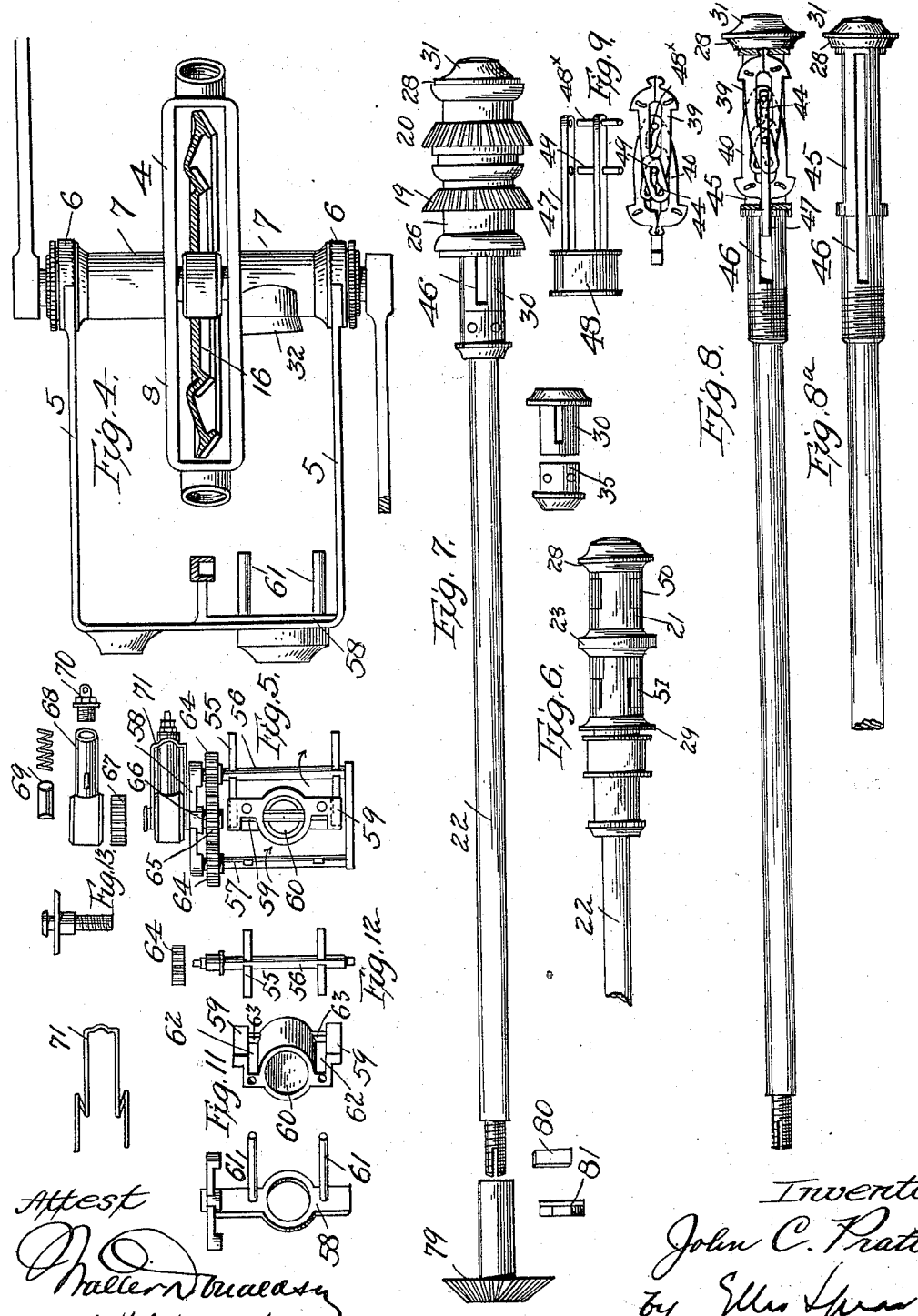

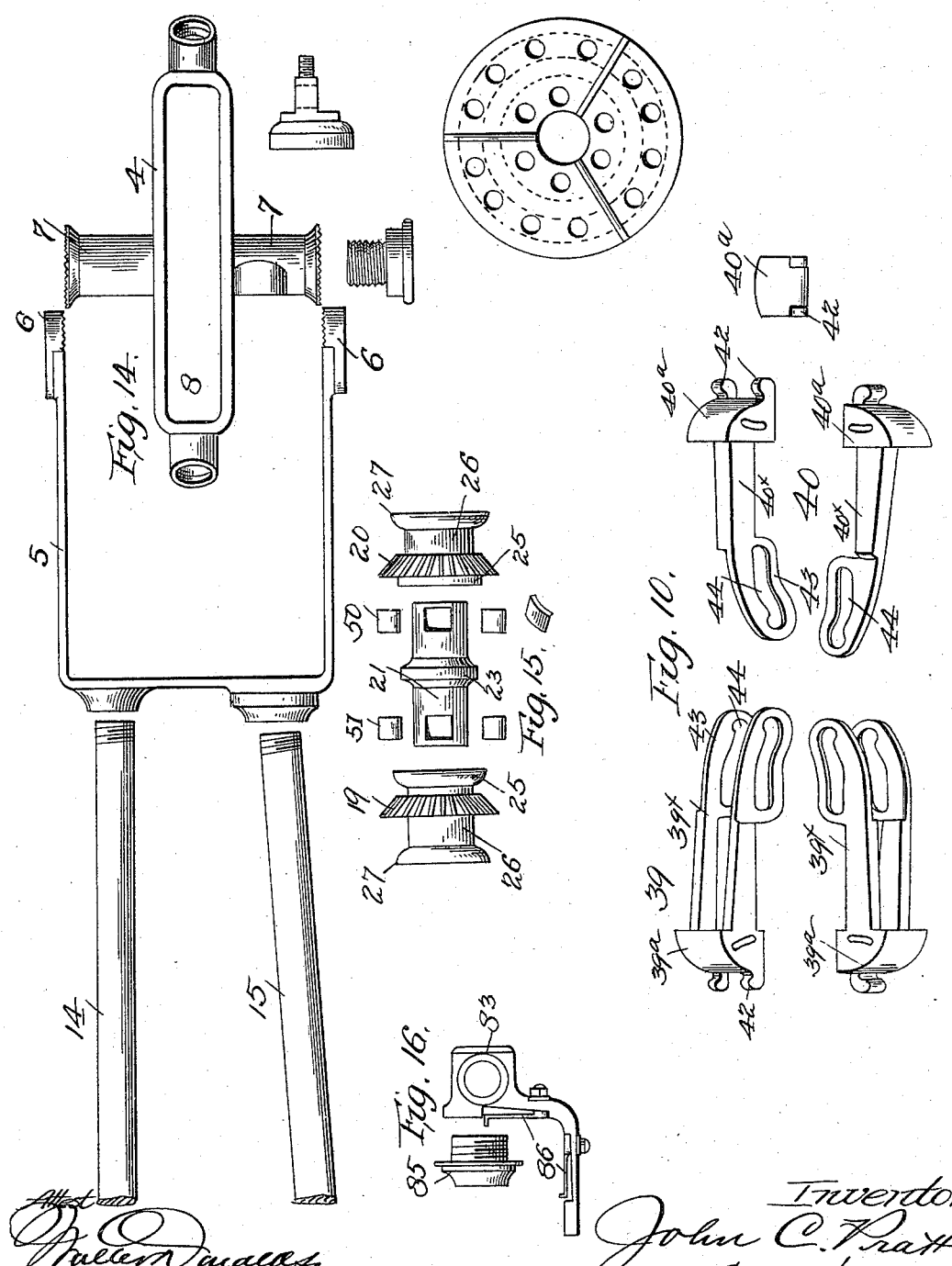

JOHN C. PRATT, OF HARTFORD, CONNECTICUT, ASSIGNOR OF ONE-HALF TO ALBERT K. PETTINGILL, OF BOSTON, MASSACHUSETTS.

CHAINLESS CHANGE-GEAR BICYCLE.

SPECIFICATION forming part of Letters Patent No. 573,102, dated December 15, 1896.

Application filed April 10, 1895. Serial No. 545,229. (No model.)

*To all whom it may concern:*

Be it known that I, JOHN C. PRATT, a citizen of the United States, residing at Hartford, in the county of Hartford and State of Connecticut, have invented certain new and useful Improvements in Chainless Change-Gear Bicycles, of which the following is a specification, reference being had therein to the accompanying drawings.

It is the object of my invention to provide a simple, inexpensive, and durable form of chainless bicycle, which, besides having many features of advantage and improvement as applied to simple or single-gear machines, embodies a special arrangement of changeable gearing and a clutch whereby the operator can at will change the driving mechanism from a high to a low speed machine or the reverse, at the same time decreasing or increasing the leverage and changing the amount of power required to drive the machine. Such a machine is especially adapted to road-riding in which many different kinds of roads are encountered and hills must be climbed.

In my machine I am to provide a change-gear mechanism of the simplest possible kind and in which a movement of a handle or other suitable bar will at one action change the machine from a high to a low gear and at the next action similar in all respects to the first movement will change the machine back to its former condition.

In the drawings, Figure 1 is a side view of the machine; Fig. 2, a plan view of the driving mechanism; Fig. 3, a sectional plan view of the same; Fig. 4, a detail view of the main double driving-gear and its supporting-frame; Fig. 5, a detail view of a clutch-shifting device; Figs. 6 and 7, details relating to the gearing and the clutch; Fig. 8, a side view of the main driving-shaft, partly in section. Fig. 8ª is a detail of the driving-shaft; Figs. 9 and 10, details of the clutch. Figs. 11 and 12 show further details relating to the clutch-changing device. Fig. 13 shows details relating to a pawl-and-ratchet mechanism for operating the clutch-shifting device. Fig. 14 is a plan view of parts of the supporting-frame detached from each other. Fig. 15 shows details of the clutch detached. Fig. 16 is a detail view of a rear supporting-bracket. Fig. 17 shows details of a combined brake and change-gear operating connection.

The frame of the machine is substantially diamond shape, the inclined bar 1, the rear fork 2, and the standard 3 all being connected to the central frame 4. The central frame is made up of a yoke or fork portion 5, (see Figs. 2, 3, and 4,) having bearings 6 at its front ends, between which is fitted a transverse divided sleeve portion made up of the two sections 7, formed with the central loop and which connects the two sections rigidly together. The sleeve-sections are screw-threaded internally and are held to the fork 5 by the threaded cups 9, extending through the bearings of the fork and fitted into shouldered seats 10 thereof.

From the front and rear of the central loop portion 8 of the central frame the inclined bar 1 and seat-standard 3 extend, being screwed into sockets on said loop portion, the shape of which is plainly shown in Fig. 1 as consisting of the inclined portions $1^\times 3^\times$. The standard 3 is curved at its lower end to make a strong joint with the portion $3^\times$ of the central loop and thus avoid sharp bends, and consequently securing strength and beauty of lines.

The axle of the driving-gear passes through the sections 7 of the divided sleeve, and its threaded ends have nuts 12 thereon with grooves in the inner faces thereof, and between these and the curved or grooved surface of the cups 9 antifriction-bearings 13 are arranged. The pedal-arms are secured to the ends of the axle. The sides 14 15 of the rear fork are formed of tubing screw-threaded into sockets in the cross-piece of the central fork 5. By this construction of central frame the parts are readily put together or taken apart, it being only necessary to remove the axle and the cup-bearings when the yoke 5 and the central loop or sleeve portion may be separated from each other. The main driving-gear 16 is fixed on the axle and revolves within the central loop portion. This gear is double, having two sets of beveled teeth 17 18, arranged to mesh with the two gears 19 20, arranged loosely on a sleeve 21, which is fixed to the main driving-shaft 22. This sleeve has a central rib 23, on each side of which are curved ways for friction-balls 24, upon which the flanges 25 of the gears roll. The gears have hubs or extensions 26, and these also have curved flanges 27 bearing on antifriction-balls running in ways formed in the head 28 of the shaft and in the head 29 of a collar 30, fixed to the shaft. The end of the driving-shaft has an extension or journal 31, fitting in a cup-shaped bearing 32, formed on a stud $32^\times$, extending across one of the central sleeve-sections and having its end screwed into the opposite side of the sleeve, antifriction-balls being interposed between the journal extension and the cup-shaped bearing.

The shaft is screw-threaded at 34, and on this is screwed a collar 35, which is fixed thereto by suitable pins. Antifriction-balls are used between the head of this collar and a cup 36, threaded into a socket 37, formed in the cross-bar of the central yoke or frame. The collar 35 abuts against the collar 30.

From the above description it will be seen that the change-gearing is arranged within the space formed by the central bearing-sleeve and the central yoke or fork, and, further, that there is a firm bearing for the driving-shaft on each side of the said gearing and in close proximity thereto, so that said gearing will be firmly supported to resist the strain and there will be no liability for the shaft to be twisted or strained.

The portion of the shaft inclosed by the sleeve is slightly larger than the rest of the shaft, and through this enlargement a slot 45 is made, and in this the clutch is arranged. This clutch consists of four clutch-levers arranged in pairs 39 40, the pair 39 having double arms $39^\times$ and the pair 40 single arms $40^\times$. Each pair has clutching-heads $39^a$ $40^a$, and the members of each pair of clutch-levers are pivotally supported at their heads by projections or pivots 42, fitting in recesses in the ends of the slots. All of the clutch-levers have enlargements 43, with inclined slots 44 therein. The arms of the pair of levers 39 fit one pair within the other and the arms of the other pair of levers cross each other, as in Fig. 9, and extend between the arms of the levers 39. A compact arrangement of clutch-levers is thus made, the heads of the levers being at opposite ends of the slot in the shaft, while the arms of said levers overlap, extend by, and are fitted to each other so as to occupy little space. The shaft is also slotted at 46 at right angles to the slot 45, said slot 46 being narrow and extending along both the enlargement and the smaller part of the shaft. In this slot slides a fork 47, attached to a shifting sleeve or collar 48, arranged to slide on the outside of the collar 30 heretofore mentioned and fixed to the shaft. This fixed collar is slotted, as shown in Fig. 7, to admit the shifting fork 47. The fork has two cross-pins, the forward one of which, $48^\times$, passes between the double arms of the pair of levers 39 and through the slots in the single arms of the pair of levers 40, and a second pin 49 passes through the slots in the ends of the double arms of levers 39 and between the arms of levers 40, and the arrangement of the pins with relation to the slotted ends of the lever-arms is such that when the fork is slid one way, for instance toward the left of Fig. 8, the pair of levers 39 will be operated by the pin 49, so as to separate the members of the pair 39 and move them away from each other about their pivots. This will move outwardly the head portions of said levers, with the effect of pressing outwardly friction clutch shoes or blocks 50, which are fitted to openings in the sleeve 21, and these engaging by frictional contact with the inside of the gear 20, thus fixing the said gear to the driving-shaft by the friction between the parts. This gear meshes with the beveled inner gear 18 of the double driving-gear, and thus the machine will be driven at a slow rate of speed. This movement of the shifting fork to the left of Fig. 8 at the same time causes the first pin 48 to move the arms of the pair of levers 40 toward each other, thus withdrawing their heads from forcing out their corresponding clutch-shoes 51 and therefore leaving the other gear, 19, perfectly free to rotate without effect and practically without friction. The clutch shoes or blocks, as before stated, are arranged in openings in the fixed sleeve 21 and above and below the slot 45 in the enlarged part of shaft. These shoes are segmental in form and are curved to correspond exactly with the cylindrical exterior of the sleeve 21, and when they are retracted from the gear they are perfectly flush with the sleeve, and the gear can revolve as freely about them as though the sleeve were continuous from end to end. This form of clutch compensates for its own wear and is of material advantage over all forms of clutches in which interlocking jaws or teeth are used, as it may be thrown in instantly at any time. When the shifting fork is moved in the opposite direction from that above described, the levers 40 will be separated and the levers 39 closed, thus releasing the inner gear and fixing the outer gear 19.

The shifting collar 48 is moved by the arms 55 on shafts 56 and 57, journaled in a bracket 58, secured to the central fork or yoke of the frame. The arms of these shafts are arranged to act alternately, and those of shaft 56 are set a quarter-turn from those of shaft 57. The shafts are moved step by step in unison, one quarter-turn being made for each changing of the gear, and by reference to Fig. 5 it will be seen that if shaft 56 is turned in the direction of the arrow its arms will engage the lateral extension 59 from the sleeve 60, which is carried between the flanges of the collar 48, and said parts will be moved with the shifting fork to change the gearing. In this quarter-turn of the shafts the arms of shaft 56 will engage the sleeve extension with a wiping action and will then disengage the sleeve and leave it in moved position. The lateral extensions of the sleeve are guided on pins 61, extending from the bracket 58, and the entire arrangement is designed to operate with the least possible friction and requires the least power. When the sleeve 60 is moved by the arms of shaft 56, as described, the shaft 57 is also moved in unison with the shaft 56 in the direction of the arrow, Fig. 5, and its arms are brought around by this movement to contact with the lateral extensions of sleeve 60, ready to shift the sleeve with the clutch devices back to their former position when the operator desires to again change the gear of his machine. The arms of the shaft work in grooves 62 of the lateral extension 59 and move the sleeve by contacting with cross-pieces 63, Fig. 11, at the ends of said grooves. The two shafts are moved in unison by pinions 64 thereon engaging with a central pinion 65 on a shaft 66, journaled in the bracket 58, said shaft having a ratchet-wheel 67 thereon operated by a lever 68, containing a spring-pawl 69, the details of which are shown in Fig. 13, the lever being hollow and the pawl being held in by a screw-cap 70.

A spring 71 returns the pawl-lever after each action to its former position. The pawl-lever is operated from the handle-bars of the machine by a lever 72, and in order to avoid complication of parts I have shown a single lever for operating both the change-gear and a wheel-brake. A yoke-lever 73 is pivoted to the front socket 74, which is rigid with the frame, and this yoke has an extension connected with the pawl-lever by a wire 75. The yoke is depressed by a catch or stud 76 on the brake-rod engaging with a lip on the yoke. The lip is only in line with the catch when the front and rear wheels aline and the head is turned neither to the right nor to the left, and at this time the gear may be changed. When it is desired to apply the brake, the rider simply turns the front head slightly, so that the catch on the brake-rod will not be in line with the pivoted yoke and then the operation of the brake-handle will throw the brake-rod and brake down properly to apply the brake.

The catch in the brake-rod is pressed out by a spring 77, and on the upward movement of the brake-rod the catch, being inclined, will simply recede and pass by the lip. This arrangement may be reversed, if desired, the catch and lip being normally out of line, so that the brake may be applied while going straight ahead and the change-gear effected, when it is desired, by simply turning the head slightly.

The spring-catch is so arranged that the depression of the brake-rod, when the parts are in line, will change the gear, the catch slipping from the end of the yoke and the further downward movement of the rod will apply the brake. The changing of the gear will be without effect in this instance, the brake being applied immediately after the change takes place.

The gearing at the rear wheel is composed of the two beveled gears 78 79, the former having a long hub threaded into the hub of the rear wheel and the latter having an internally-threaded hub threaded onto the threaded end of the driving-shaft, a key 80 being placed in a slot in the gear and shaft and held by a nut 81 on the shaft end.

The gear 78 has ball-bearings between it and a cone $81^\times$, threaded on a nut 82, which in turn is screwed onto the rear axle within the supporting-bracket 83, which is of substantially right-angular shape from the rear axle to the rear end of the rear fork member, which is threaded into a socket 84 on the end of the said bracket. Into the socket 84 is also screwed a cone 85, having ball-bearings between it and the gear 79. The cone-bearings are held in place against rotation by means of springs 86 on the bracket, as shown in Fig. 16.

The hub of the rear wheel has a dished portion 87 arranged adjacent to the rear gearing for protecting the same. The other member of the rear fork is connected with the rear axle by a bracket $87^\times$ and the axle is held to this bracket by a nut 88. A cone 89 on the axle has between it and a cup bearing 95 threaded in the hub, a ball-bearing.

In operating the clutch the rider has simply to manipulate the lever at the handle-bar, one action changing from a low to a high gear and the parts then setting themselves so that the next movement of the handle-bar, similar in all respects to the first, will change the machine back again from a high to a low gear.

The hub of the gear 78 has a shoulder $79^\times$ fitting a seat in the hub of the rear wheel, and a pin or screw may be used for securing these parts more firmly together from turning back. The nut 82, together with the outside nut $82^\times$, serves to fix the axle in any desired position on the rear fork, and these nuts, together with the opposite nut 88, serve to hold the axle to the forks and to adjust the ball-bearings approximately, while the finer adjustment of said bearings is derived by the cone $81^\times$ and the cup 95. The nuts $82^\times$ serve also to hold the parts with the gears properly in mesh. To remove the rear axle and the wheel, the nuts 88 and $82^\times$ are unscrewed, when the axle may be taken out, and then the wheel and gear 78 may be separated by unscrewing the hub of the gear from said wheel-hub.

It will be noticed that the arrangement of clutch-levers shown enables me to use levers of sufficient length to secure the desired leverage, and yet the arrangement occupies very little space.

It will be further noticed that the shifting sleeve for operating the clutch is supported and guided entirely by the guide-pins 61.

This relieves the rotary parts of all friction, the shaft merely rotating within the sleeve, which, as it were, is supported independent of the shaft.

I claim as my invention—

1. A bicycle comprising the crank-shaft, the driving-gear thereon, the gearing at the rear axle, the driving-shaft leading thereto, the central sleeve surrounding the crank-shaft and having a bearing for the driving-shaft, the yoke having its ends held to the ends of the sleeve, the rear fork extending from the yoke and the bearing in the yoke for the driving-shaft, said shaft extending through one side of the rear fork and the gear thereon meshing with the driving-gear, substantially as described.

2. A bicycle comprising the crank-shaft, the sleeve about the same connected with the frame and composed of two sections with the connecting-loop between them, the driving-gear arranged on the crank-shaft within the loop portion, the yoke secured to the ends of the sleeve and about the crank-shaft, the rear fork connected to the yoke, the driving-shaft, the bearings therefor in the yoke and sleeve and the gear intermediate of said bearings arranged on said driving-shaft, substantially as described.

3. In combination in a chainless bicycle, the combination of the crank-shaft, the gear thereon, the sleeve about the crank-shaft, the driving-shaft extending to the rear wheel and the bearing for the said shaft carried by the sleeve extending transversely across and within the same and having a threaded shank engaging the sleeve, said shank having also a perforation through it for the crank-shaft, substantially as described.

4. In combination in a chainless bicycle, the crank-shaft, the two-part sleeve surrounding the same, the loop connecting the sleeve-sections and having upwardly-inclined portions, the frame-bars secured to said inclined portions, the driving-gear arranged between the sleeve-sections, the yoke connected to the sleeve-sections, the rear fork connected to the yoke, the driving-shaft, the gear thereon meshing with the driving-gear and the bearings for the driving-shaft in the yoke and sleeve, respectively, substantially as described.

5. A chainless change-gear bicycle comprising the crank-shaft, the double gear thereon, the driving-shaft, the pair of gears loose thereon, the friction clutch-blocks about the shaft and between the same and the gears, the said shaft being slotted and the clutch-levers arranged in said slot and adapted to force the blocks outwardly and means for operating the clutch-levers, substantially as described.

6. In a chainless change-speed bicycle, the combination of the frame, the crank-shaft, the driving-gear, the driving-shaft slotted at its forward end, the gears about the slotted part and the levers pivoted at their outer ends at opposite ends of said slot having their arms extending inwardly lapping by each other and slotted and the sliding fork for operating the levers, said levers having clutching portions at their outer pivoted ends, substantially as described.

7. In combination in a chainless change-gear bicycle, the frame, the main driving-gear, the driving-shaft having the slot, the sleeve fixed to the shaft, the segmental blocks in said sleeve and conforming to the curve thereof, the clutch-levers in said slot arranged to act on the clutch-blocks and means for operating the clutch-levers, substantially as described.

8. In combination in a chainless change-speed bicycle, the crank-shaft, the driving-gear, the driving-shaft having a slot, the gears about the same and the two pairs of clutch-levers, one pair having double arms and the other single arms, said arms lapping by each other and slotted, and the fork-slide for operating the clutch-levers, said slide having pins extending through a slot in the side of the shaft, substantially as described.

9. In combination, in a chainless change-gear bicycle, the gears and the clutch mechanism comprising the clutch-levers, the sliding fork, the sleeve connected thereto, means for operating the sleeve in opposite directions consisting of the two shafts arranged on opposite sides of the sleeve having the arms thereon, those of one shaft being a quarter-turn from those on the other shaft and means for moving the shafts step by step in one direction, substantially as described.

10. In combination in a chainless bicycle, the gearing, the clutch mechanism, the hand-lever at the handle-bar, the pawl-and-ratchet mechanism operated step by step and the clutch-shifting device arranged to be operated one way at one action of the pawl and ratchet and to be operated the reverse way at the next action of the same, substantially as described.

11. In combination in a chainless bicycle, the gearing, the clutch mechanism, the shifting sleeve, the two shafts one on each side of the sleeve and having wiper-arms a quarter-turn from each other to engage the sleeve alternately, the pinions for operating the shafts and the pawl and ratchet with connections for operating the same, substantially as described.

12. In combination in a chainless bicycle, the gearing, the clutch mechanism, the shifting sleeve connected thereto having grooves, the guide-pins upon which the sleeve slides and the rotary shafts having wiper-arms for engaging the sleeve with means for operating the shafts, substantially as described.

13. In combination, the change-gear mechanism, the brake lever and rod, the lever pivoted to the frame and connected with the change-gear mechanism and a clutch on the brake-rod arranged to operate the lever, said clutch and lever being moved into and out of line by turning the head and handle-bars, substantially as described.

14. In combination, the change-gear mechanism, the brake lever and rod, the yoke-lever pivoted to the frame and the spring-catch on the brake-rod arranged to operate the yoke-lever when moved down but to yield and pass the same when moved up, substantially as described.

15. In combination, the rear fork, the axle extending between them, the nuts 82× and 88, the inner nut 82 on a threaded part of the shaft for holding the axle on the inside of the fork, the cone-bearing threaded on the said nut 82, the gear 78 having the shoulder-hub, the rear wheel having a hub to receive the threaded end of the gear-hub, and the cup-bearing 95 screwed into the wheel-hub, substantially as described.

In testimony whereof I affix my signature in presence of two witnesses.

JOHN C. PRATT.

Witnesses:
 HENRY E. COOPER,
 WALTER DONALDSON.

Correction in Letters Patent No. 573,102.

It is hereby certified that the name of the assignee in Letters Patent No. 573,102, granted December 15, 1896, upon the application of John C. Pratt, of Hartford, Connecticut, for an improvement in "Chainless Change-Gear Bicycles," was erroneously written and printed "Albert K. Pettingill," whereas said name should have been written and printed *Ubert K. Pettingill;* and that the said Letters Patent should be read with this correction therein that the same may conform to the record of the case in the Patent Office.

Signed, countersigned, and sealed this 12th day of January, A. D., 1897.

[SEAL.]

JNO. M. REYNOLDS,
*Assistant Secretary of the Interior.*

Countersigned:
   S. T. FISHER,
     *Acting Commissioner of Patents.*